July 20, 1926.

T. F. O'ROURKE ET AL 1,593,137

GAS FILTER AND STRAINER

Filed Dec. 1, 1924

Inventor
Thomas F. O'Rourke,
Emil Chalupa,
By James F. Duhamel,
Attorney

July 20, 1926.  
T. F. O'ROURKE ET AL  
GAS FILTER AND STRAINER  
Filed Dec. 1, 1924  
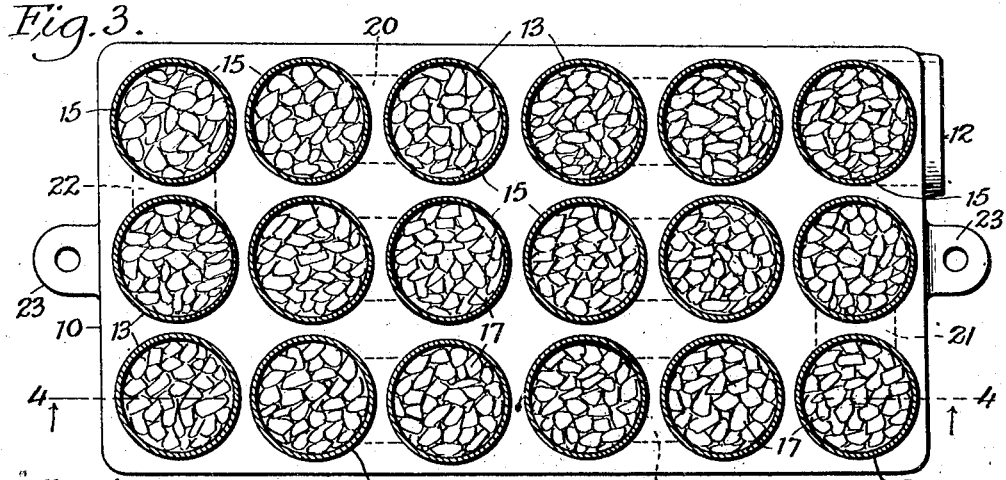
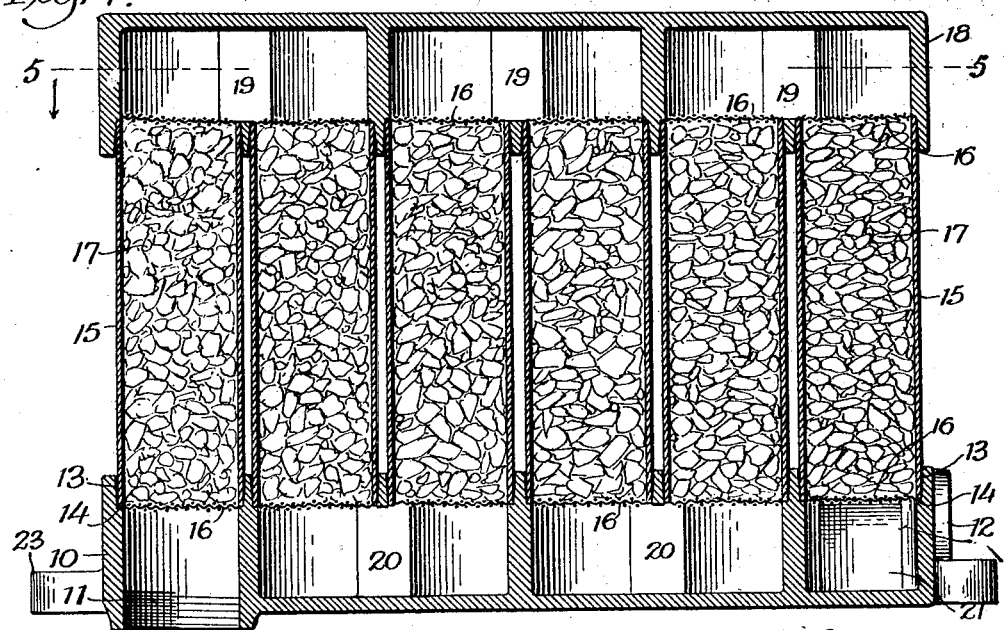
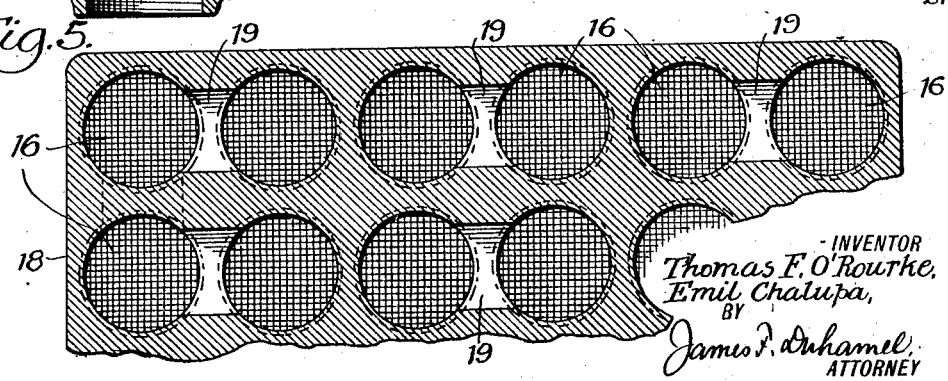
INVENTOR  
Thomas F. O'Rourke,  
Emil Chalupa,  
BY James F. Duhamel,  
ATTORNEY Patented July 20, 1926.

1,593,137

UNITED STATES PATENT OFFICE.

THOMAS F. O'ROURKE AND EMIL CHALUPA, OF NEW YORK, N. Y.

GAS FILTER AND STRAINER.

Application filed December 1, 1924. Serial No. 753,393.

This invention relates to filters and strainers and more especially smoke and gas strainers and its object is to eliminate the poisonous elements from the products of combustion of gas engines by locating at the exhaust thereof a series of circulating tubes or coils containing filtering and straining means treated with certain chemicals that will absorb the poisonous and dangerous elements of the discharged vapors or so separate and break them up as to deliver the same at the outlet in a perfectly harmless condition.

This result is attained in the present invention by arranging series of vertical pipes between a base and a head and supplying each pipe with perforated or porous diaphragms to enclose the chemical preparation and adapted to allow the passage of the waste gases from an exhaust pipe and up and down the plurality of alternate pipes and finally to be released out of a vent after passing through the loose and disintegrated chemical or chemical container which has been saturated with the preparation that disorganizes the gases.

These and other objects and details of the invention are more fully described in the following specification set forth in the claims and illustrated in the accompanying drawings, wherein:

Fig. 3 is a horizontal sectional view through line 3—3 of Fig. 1.

Fig. 4 is a vertical sectional view through line 4—4 of Fig. 3.

Fig. 5 is a fragmentary horizontal sectional view through the head and on line 5—5 of Fig. 4.

Figure 1:
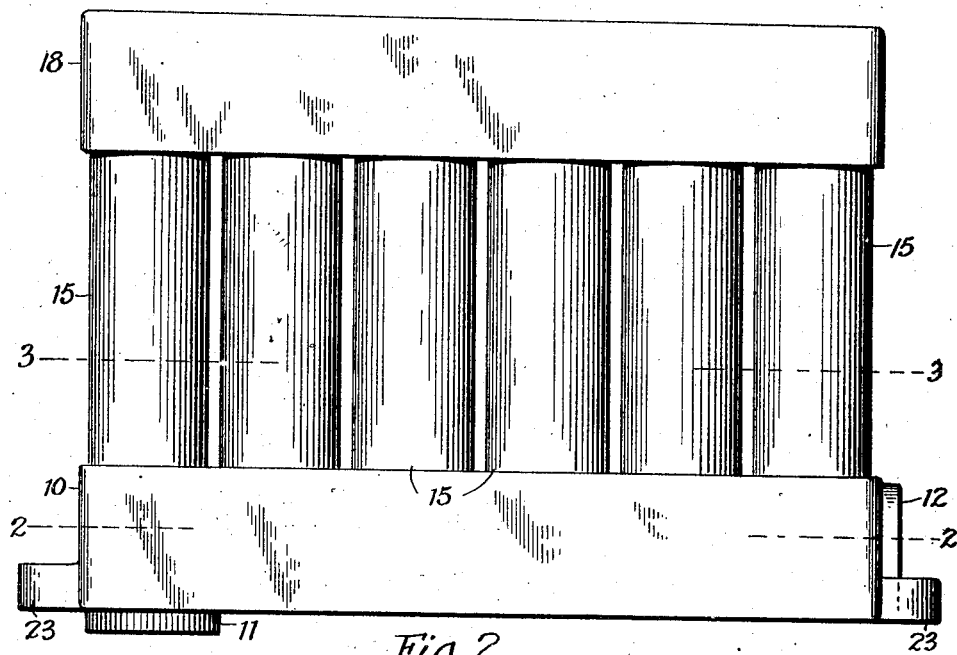
Figure 1 is a side elevation of the improved strainer.

The most serious and dangerous result of the use of hydro-carbon fuel in motors is the production of very poisonous gases that must be discharged during the course of the operation of the engine and when released in an enclosure are very destructive to animal life.

Many fatalities occur where persons thoughtlessly confine themselves within a room or garage when a gas engine is operating and the noxious gases are so dangerous and sudden in their effects that no warning by odor or otherwise is given them and they very soon succumb to the deadly vapors.

By passing these products of the combustion of gas engines through strainers provided with certain chemicals that will absorb the poisonous elements or disorganize the gases and counteract their injurious powers, the vapor may be discharged in a perfectly pure and wholesome condition.

A device by which this result may be obtained is shown in the drawings wherein a base 10 of cast metal is provided and at one end has the inlet 11 with suitable internal screw threads for the connection with the outlet from a manifold exhaust, while at the extreme farther corner is the outlet 12 for the purified air.

In the base 10 are a plurality of sockets 13 having shoulders 14 and inclined walls and arranged in series so that communication may be established between certain adjacent sockets as will be later explained. Fitted in the sockets 13 are tubes 15 and as shown in these drawings these constitute three rows although it is obvious that the number of rows and also the number of tubes in a row may be varied as the demand requires.

At the top and lower end of each tube is a perforated diaphragm 16, preferably of wire mesh, that makes the tube a container for an absorbent material 17 such as shavings, coke or material that will not pack solid but permit of enough air space to allow the passage of the vapors or gases to be treated. The amount of this material, the amount of saturation and the size of the particles are regulated by the work to be done or the force of the exhaust discharge to pass the porous mass and permit of its escape.

On the top of the tubes 15 is fitted a head 18 with sockets 13 and shoulders 14 identical with the base 10 but with no inlet nor outlet as at 11 or 12 in the latter.

Figure 2:
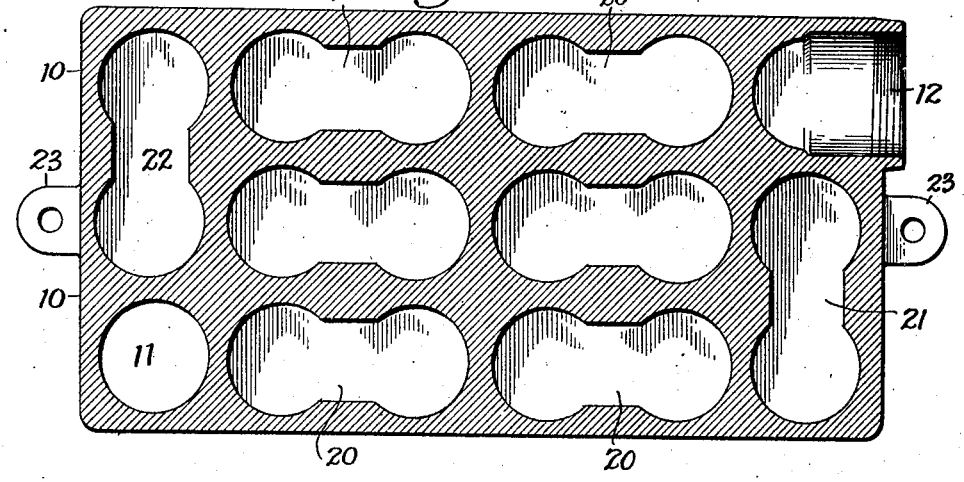
Fig. 2 is a horizontal sectional view through the base and on the line 2—2 of Fig. 1.

Communication between the base, the tubes and the head is best shown in Figs. 2 and 4 where it will be seen that the vapor entering the inlet 11 passes up through the first tube in the first row and then through a passage 19 in the head to the upper end of the second tube of the first row and down the same to the passage 20 in the base to the third tube. In other words the passages are not continuously from one socket to the other but are arranged alternately in both base and head.

By this means the vapor passes up and down the tubes and the passages until it reaches the lower end of the last tube and will leave the row by the lateral passage 21 in the base and center the middle row at the bottom of its last tube and circulate through the tubes of this row and pass out of same through the lateral passage 22 in the head 18 into the last row from which it eventually, in its circulations, leaves the base through the outlet 12.

This outlet 12 is of greater size than the inlet to allow of as much freedom of movement for the fluid as possible and perforated ears 23 are located at each end of the base to afford a means for attaching the device to a foundation.

To secure the tubes 15 into the sockets 13 of both head and base compression is resorted to and this insures a perfect air tight fit and serves to hold the parts together although for the purpose of replenishing and repairing, the parts may be made separable if desired.

It is obvious that the parts may be otherwise arranged or modified without departing from the essential features above described or from the scope of the appended claims.

What we claim as new is:

1. In a gas filter and strainer, the combination of a base having sockets and an inlet and an outlet, a head having sockets corresponding with the sockets of the base, tubes adapted to contain chemically treated filtering material and connecting the adjacent and corresponding sockets of the base and the head, and communicating means between the sockets to form a continuous fluid passage through the tubes and the sockets from the inlet to the outlet.

2. In a gas filter and strainer, the combination of a base having sockets and an inlet and an outlet, a head having corresponding sockets to those in the base and to the inlet and outlet, tubes adapted to contain a filtering material and having their ends secured in correspondingly located sockets of the base and the head, communicating means between pairs of sockets in the base, and communicating means between the alternating pairs of sockets from the base for sockets in the head and forming a continuous passage for a fluid between the inlet and the outlet and the sockets and the tubes.

3. In a gas filter and strainer, the combination of a base having sockets adapted to be in communication in pairs and with the inlet and outlet, a head having sockets similarly located to those of the base and also communicating alternately in pairs with those of the base, and tubes having perforated tops and bottoms and adapted to be forced into the sockets to hold them with the base and head as one structure.

4. In a gas filter and strainer, the combination of a base having passages and an inlet and an outlet, a head having passages, and tubes having perforations at their ends fitted in the ends of the passages so that the tubes may communicate with each other thereby and with the inlet and the outlet.

5. In a gas filter and strainer, the combination of a base having perforations and communications between pairs of these perforations, a similarly constructed head having perforations and passages and the latter alternating from those of the base, tubes having their ends forced into the perforations, and strainers at the ends of the tubes and confining a filtering material therein.

6. In a gas filter and strainer, the combination of a base having passages perforated at each end, a head having similar but alternately located passages and perforations, tubes adapted to contain a filtering material and having their ends forced into the perforations of the base and the head, and straining diaphragms at the ends of the tubes and the passages.

7. In a gas filter and strainer, the combination of a base having a plurality of rows of perforations and interior passages connecting the perforations in pairs and also the rows, a head having identically located perforations and alternately located passages from the base, and tubes adapted to hold filtering material and whose ends are driven into the said perforations to form a continuous circulation passage between an inlet and an outlet in said base.

In testimony whereof we hereunto affix our signatures.

THOMAS F. O'ROURKE.
EMIL CHALUPA.